United States Patent [19]

Webb

[11] Patent Number: 5,058,844

[45] Date of Patent: Oct. 22, 1991

[54] PIVOTAL MOUNTING BRACKET

[75] Inventor: Lloyd Webb, Akron, Ohio

[73] Assignee: Frank Hotlosz, Akron, Ohio ; a part interest

[21] Appl. No.: 547,471

[22] Filed: Jul. 2, 1990

[51] Int. Cl.⁵ .............................................. F16M 13/00
[52] U.S. Cl. .................................... 248/286; 248/293; 403/61
[58] Field of Search ...................... 248/291, 293, 286; 211/99, 100; 403/61

[56] References Cited

U.S. PATENT DOCUMENTS

| | | | |
|---|---|---|---|
| 1,892,687 | 1/1933 | Teufel | 211/99 |
| 4,611,721 | 9/1986 | Heckaman | 211/99 X |
| 4,770,440 | 9/1988 | Lander | 280/760 |
| 4,844,496 | 7/1989 | Kohler | 280/4 |

Primary Examiner—Alvin C. Chin-Shue
Attorney, Agent, or Firm—Oldham & Oldham Co.

[57] ABSTRACT

A bracket for pivotally mounting an object to a rigid surface comprises a first member, a second member and a means for pivotally fastening said first member to said second member. Particular applications for such a bracket are found with respect to pivotally storing a heavy object for transport purposes.

4 Claims, 3 Drawing Sheets

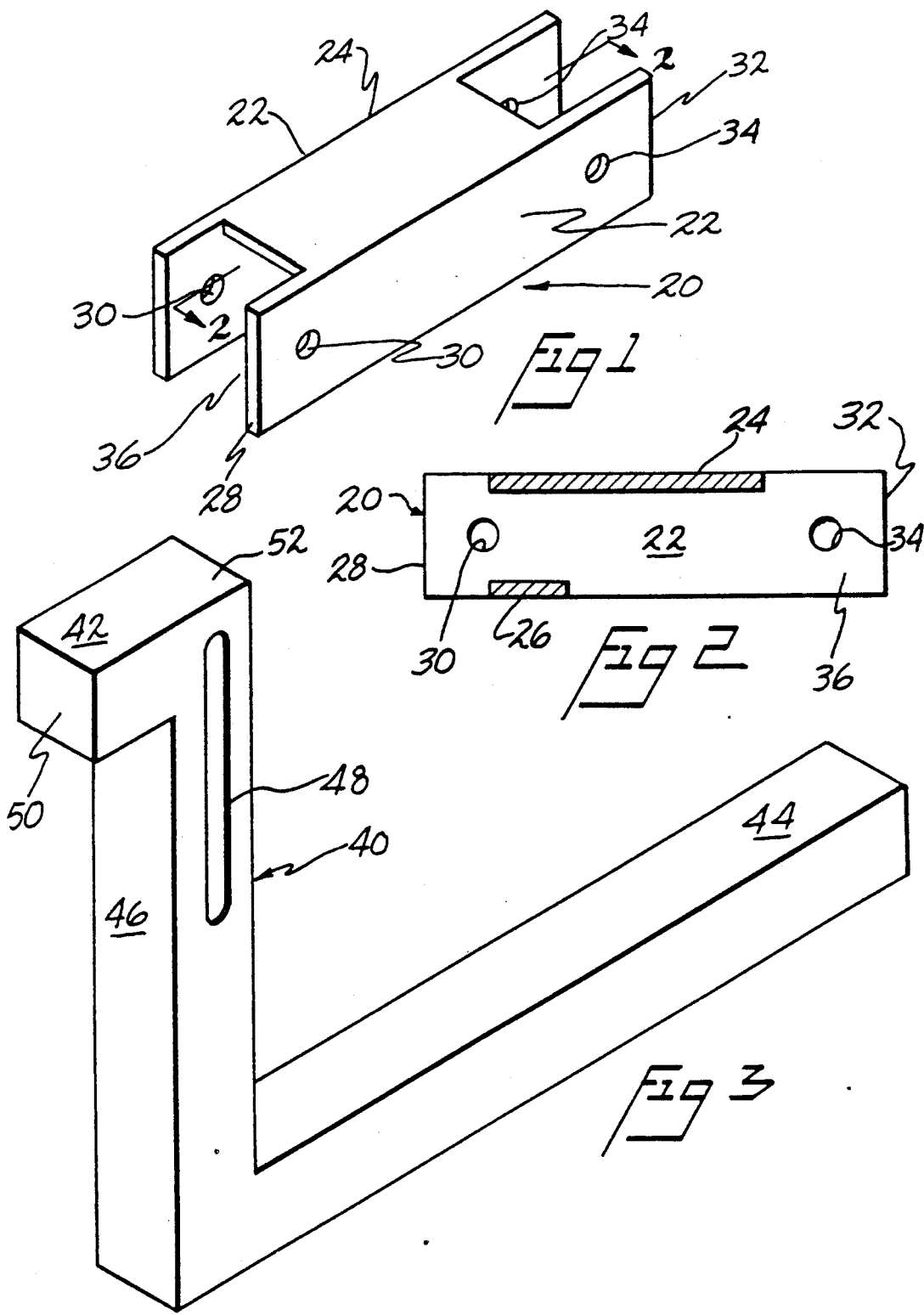

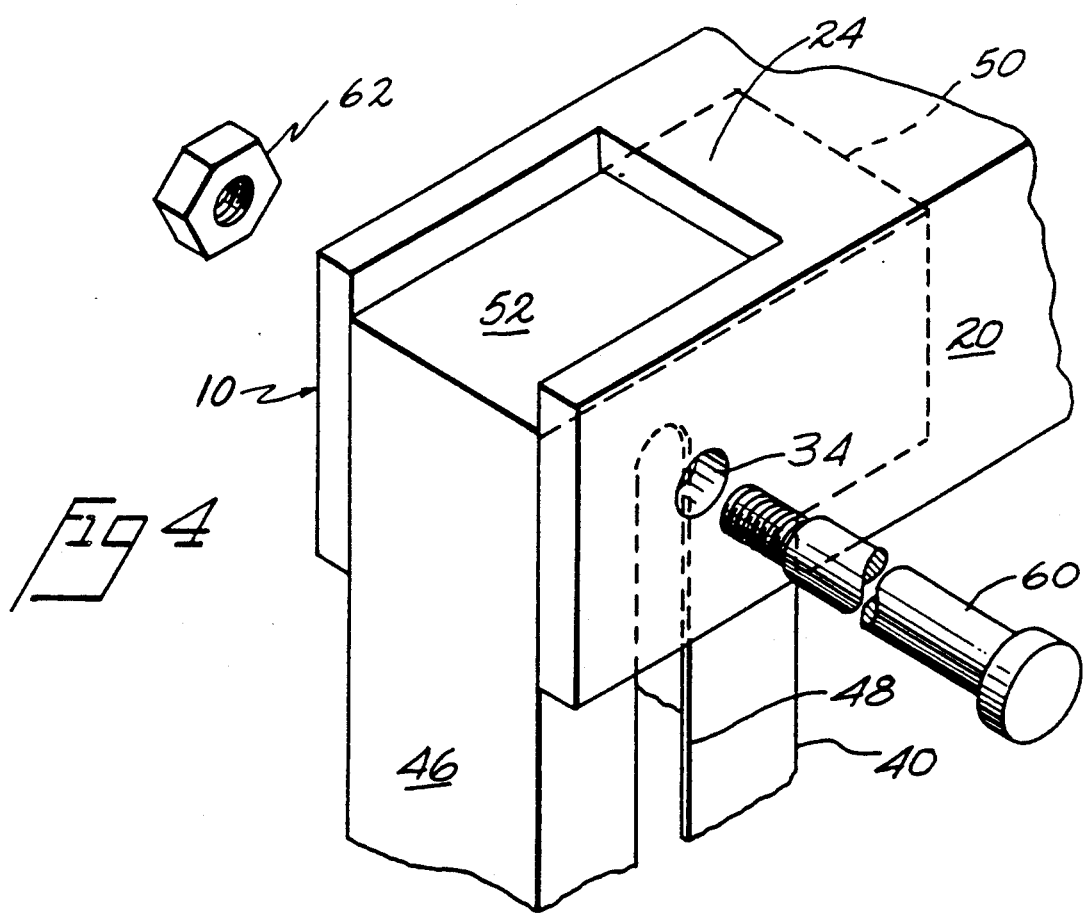
_Fig 4_
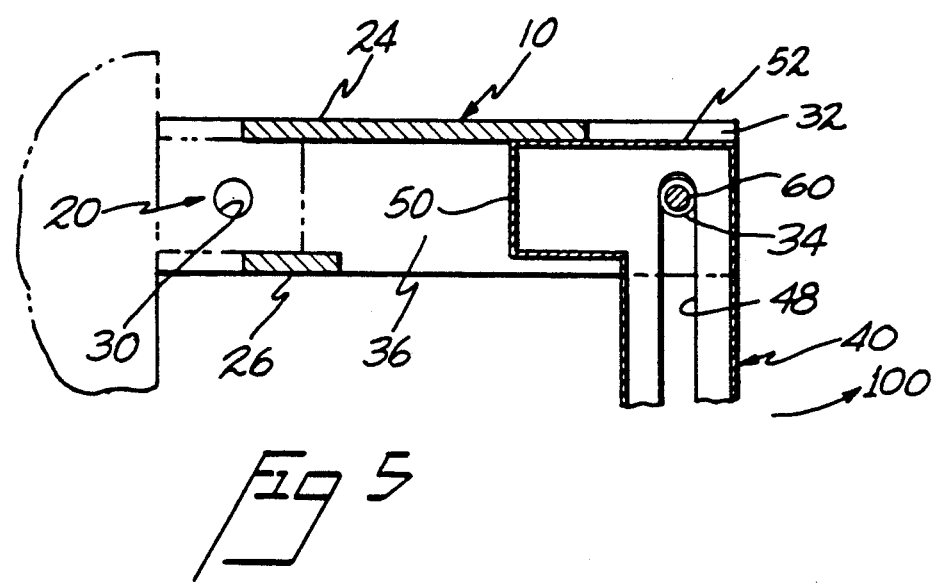
_Fig 5_

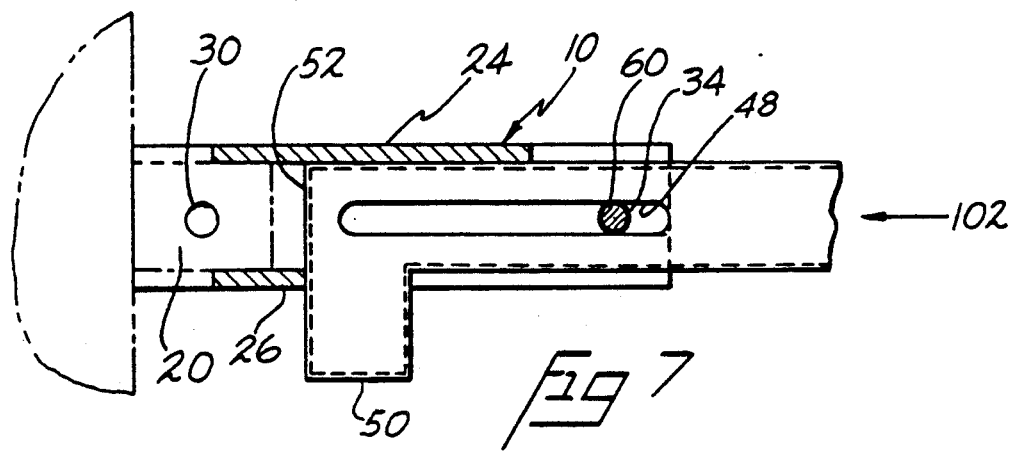
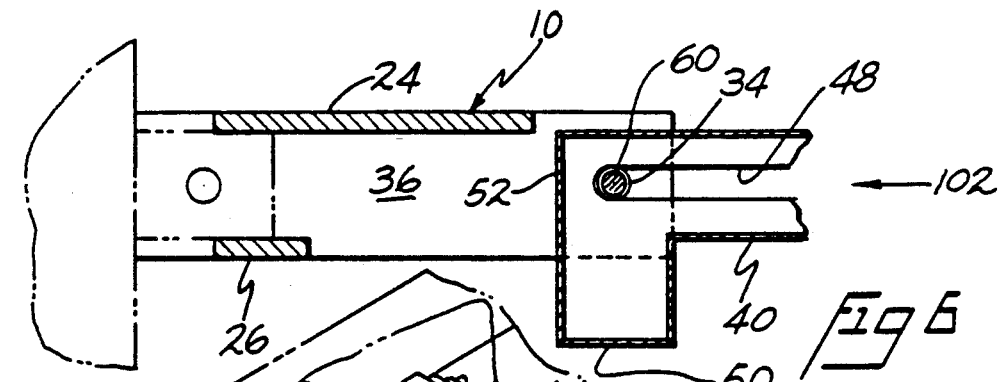
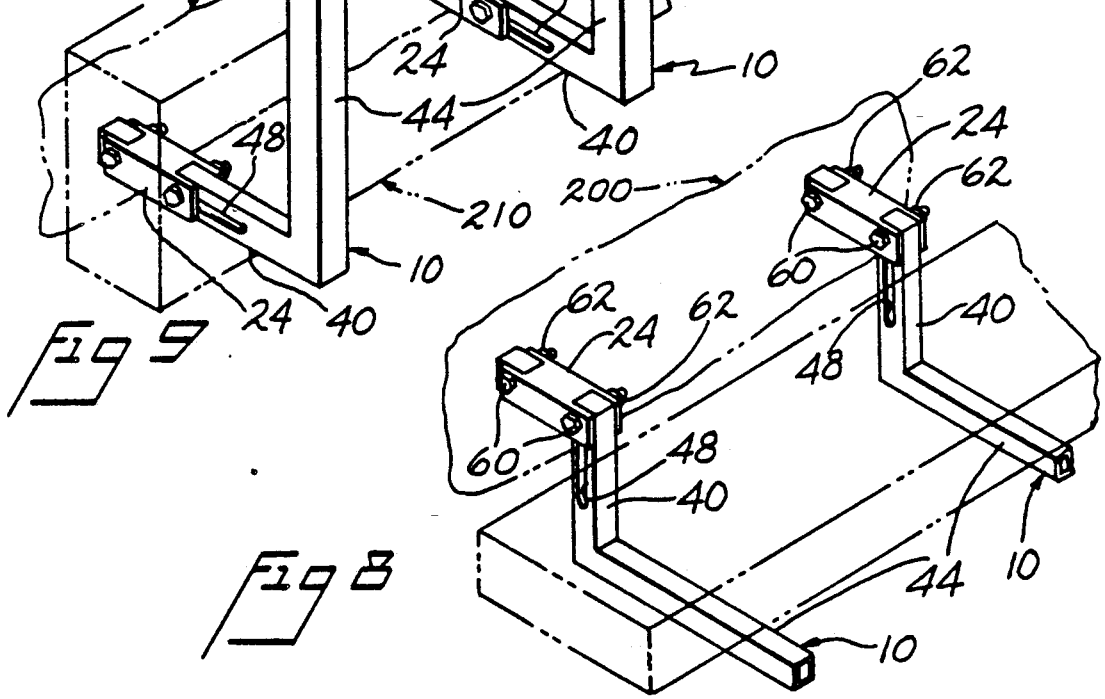

PIVOTAL MOUNTING BRACKET

TECHNICAL FIELD

This invention relates to a bracket for mounting an object to a rigid surface. More particularly, this present invention relates to a bracket for mounting an object to a rigid surface in an pivotal manner, so that the bracket locks into place at the extremes of its rotation, such rotation being limited to a range generally of about 90 degrees. A particular application of such a bracket is in the construction industry, where it is necessary to transport heavy work equipment to a field location.

BACKGROUND OF THE INVENTION

It is common in many industries, but particularly in the construction industry, to be required to transport heavy work tools to a work site. For example, in the aluminum siding industry, a particularly heavy piece of equipment for bending and shaping aluminum siding is required to be at the construction site. This piece of equipment, commonly known in the trade as a "brake", weighs in excess of 100 pounds and requires a rigid horizontal work surface to be provided at the job site. Typically, a pair of saw horses or other portable legs are positioned and the brake is unloaded from the truck and seated upon the saw horses or portable legs for use. At the end of the day or work session, the brake must be removed from its work surface, reloaded into the truck and the saw horses stowed upon the truck. Such a repetitive process is physically straining to the workers and provides an unwelcome opportunity for worker injury, particularly the debilitating sort of injuries that can be incurred in lifting and moving equipment.

Certainly the problem presented by the brake in the siding industry is merely illustrative and applications involving many additional pieces of heavy equipment, especially those in the construction industry, will be apparent to the potential user of the present invention.

SUMMARY OF THE INVENTION

A first object of the invention is to provide a bracket for pivotal mounting an object to a rigid surface, thereby presenting the object in a useful position for operation when the bracket is in a first or lowered position and presenting the object in a locked and stowed second position approximately 90 degrees angularly from the first position when the bracket is rotated.

These and further objects of the invention are obtained by a bracket for pivotally mounting an object to a rigid surface, said bracket comprising: an essentially hollow tubular first member having two mirror-image side plates connected in a parallel manner by a bottom plate and a top plate, said first member having first and second ends, said first end being adapted for mounting to said rigid structure, and said second end being a clevis wherein said side plates comprise the forks of said clevis, each said fork having an aperture colinearly disposed therethrough, the essentially hollow interior of said first member comprising a channel at said second end; an essentially hollow tubular second member having an essentially "Z"-shape with first, second and third straight sections connected sequentially in essentially perpendicular manner so that said first and third sections are connected to opposing sides of, and are on opposite ends of, said second straight section, an elongate slot being disposed longitudinally on the two opposing mirror-image sides of said second section which are coplanar with the essentially "Z"-shape; a means for fastening said first member to said second member; a means for mounting said first end of said first member to said rigid surface; and a means for mounting said object to the third section of said second member.

BRIEF DESCRIPTION OF THE DRAWINGS

FIG. 1 shows the first member of the bracket of the present invention in perspective view;

FIG. 2 shows a cross-section of the first member taken along Line 2—2 in FIG. 1;

FIG. 3 shows a perspective view of the second member of the present invention;

FIG. 4 shows a perspective view of the present invention, illustrating the operative engagement of the first and second members;

FIGS. 5 through 7 show, in cross-sectional view, the pivotal motion of the present invention from its lowered position (FIG. 5) to its raised and locked position (FIG. 7);

FIG. 8 illustrates a pair of the brackets of the present invention in perspective view with a phantom object in the raised and locked position: and FIG. 9 illustrates a pair of the brackets of the present invention in perspective view with the phantom object in the lowered and useful position.

ABSTRACT OF THE DRAWINGS

In the attached drawings, identical numbers are used to illustrate identical parts in the following manner:

10 is the pivotal mounting bracket of the present invention;
20 is the first member of the mounting bracket 10;
22 is the side plate of the first member 20;
24 is the top plate of the first member 20;
26 is the bottom plate of the first member 20;
28 is the proximal end of the first member 20;
30 is the aperture at the proximal end 28;
32 is the distal end of the first member;
34 is the aperture at the distal end 32;
36 is the channel interior to the first member 20;
40 is the second member of the mounting bracket 10;
42 is the first leg of second member 40;
44 is the third leg of second member 40;
46 is the second leg of second member 40;
48 is the elongated longitudinal slot of second leg 46;
50 is the distal end of first leg 42;
52 is the first end of second leg 46;
54 is the side of second leg 46 perpendicular to sides with elongated longitudinal slot 48;
60 is the shoulder bolt;
62 is the nut for shoulder bolt 60;
100 and 102 are directional arrows;
200 is the object upon which pivotal mounting bracket 10 is mounted; and
210 is the heavy object pivotally mounted to object 200 by a pair of pivotal mounting brackets 10.

DETAILED DESCRIPTION OF THE DRAWINGS

In order to understand the present invention, it is best to understand the structures of the individual parts and then to assembly them functionally as illustrated in the attached drawings.

The first member 20 of the pivotal mounting bracket 10 of the present invention is illustrated in FIGS. 1 and 2. FIG. 1 is a perspective view of the first member 20, which has a generally hollow tubular structure, preferably with a rectangular, and, even more preferably, with a square cross section. The first member 20 is comprised of a pair of mirror image side plates 22 connected in a parallel manner by a top plate 24 and a bottom plate 26, which is shown in FIG. 2. The first member 20 has a symmetry about the LINE 2—2 shown in FIG. 1. This symmetry is utilized in FIG. 2 to further disclose the features of the first member 20. The proximal end 28 of the first member 20 is adapted for affixation to a vehicle or other support structure (not shown) from which it is desired that the pivotal mounting bracket 10 be used. The particular means for affixation that is shown in FIG. 1 is to allow the side plates 22 to form a clevis-like fork at the proximal end 28 of the first member 20 for affixing to the vehicle or other support structure. When, as shown in FIG. 1, an aperture 30 is disposed in each side plate 22 of the proximal end 28, secure fastening of the bracket 10 to the support structure (not shown) can be achieved by placing a portion of such support structure through the clevis and making attachment by means of a pin, bolt, or the like passing through the respective apertures 30 and an aperture in the support structure.

The opposite end 32 of the first member 20, also referred to hereinafter as the distal end 32, is similarly adapted with a clevis-like structure. An aperture 34 is disposed in each fork of the clevis-like end, such apertures 34 being colinear to each other and normal to the side plates 22, which comprise the planar surfaces of the clevis forks, for passage of a fastening means therethrough.

The clevis-like structures formed at the respective ends 28 and 32 of the first member 20 result from the fact that the top plate 24 and bottom plate 26 of the first member 20 do not extend completely to the ends of the side plates 22. As a result of this, a generally U-shaped slot is formed at each end of the first member 20 and the generally hollow nature of the first member 20 results in an interior channel 36 being formed. These structures are best observed in FIG. 2.

Referring now more particularly to FIG. 2, which shows a cross section of the first member 20 as viewed along LINE 2—2 in FIG. 1, the top plate 24 and bottom plate 26 commence at the same distance from the proximal end 28 of the first member 28, but the bottom plate 26 extends a shorter distance along the length of the side plates 22, so that the distal end 32 of the first member 20 is more open from its bottom side than it is from the top side. This feature enhances the size and utility of channel 36 for receiving the second member, as will be illustrated later.

Referring now to FIG. 3, a perspective view of the second member 40 is disclosed. This second member 40 is an essentially Z-shaped member having a preferably rectangular, and even more preferably square, cross-section, in which the first and third legs of the "Z", 42 and 44 respectively, are disposed essentially perpendicularly to the second leg 46 and the first and third legs, 42 and 44 respectively, are positioned so that the first leg 42 and third leg 44 are affixed to opposite sides of the second leg 46, but are parallel to each other. An elongate longitudinal slot 48 is cut in each of the sides of the second leg 46 that are perpendicular to the sides to which first and third legs, 42 and 44 respectively, are attached. The elongate slot 48 is positioned in the second leg 46 so that a fastener inserted normal to the slot in the first side will emerge normal to the opposing second side. The slot 48 also runs along the longitudinal axis of the second member 40 and is co-planar with the Z-shaped dimension of the second member 40.

As with the first member 20, the second member 40 is a generally hollow tubular member, again preferably of a rectangular cross section and, again even more preferably, of a square cross section. It is not necessary that second member 40 be hollow, although this is preferred in terms of weight, as the major objective of second member 40 is to provide relatively deflection-free load-bearing capacity. In referring to the connection between the first leg 42 and the second leg 46, the connection will be referred to as being made at the proximal end of the first leg 42, so that the end of first leg 42 extending outwardly from the second leg 46 is the distal end 50. This connection between first leg 42 and second leg 46 is made at one end of the second leg, hereinafter referred to as the upper end 52 of the second leg 46. Similarly, the third leg 44 has its distal end extending outwardly from the second leg 46, the proximal end of third leg 44 being affixed to second leg 46 at its lower end.

As illustrated in FIG. 3, the relative lengths of first and third legs 42 and 44 are such that first leg 42 is much shorter than third leg 44. This is due to the respective purposes of the legs, which will be described further below.

Reference is now made to FIG. 4, which shows the connection of the first member 20 and the second member 40 of the pivoting bracket 10. The size of the second member 40, and particularly the first leg 42 and the upper end of the second leg 46, that is, the end of second leg 46 to which first leg 42 is attached, are particularly shown in FIG. 4. This upper end of second member 40 fits comfortably and non-contactingly into the channel 36 at the distal clevis end 32 of first member 20 so that a means for fastening, such as a shoulder bolt 60, can be passed sequentially through the aperture 34 on the first side 22 of the clevis like end 32, through the elongated channel 48 in the second leg 46 of second member 40 and then through the aperture 34 in the second side 22 of the clevis end 32, whereupon the bolt 60 may be secured with a corresponding nut 62. Of course, other fastening means will be known to those of skill in this art and the particular illustration of use of a shoulder bolt 60 and nut 62 is not meant to be limitative.

It is readily seen that when the connection is made in the manner illustrated in FIG. 4, the first leg 42 of second member 40 extends into channel 36 of first member 20.

As better illustrated in the cross sectional view of this connection shown in FIG. 5, the first leg 42 of the second member 40 is positioned along its length inside the channel 36 of the distal end 32 of the first member 20 so that the longitudinal slot 48 in the second member 40 is aligned with the apertures 34 in the distal end 32 of the first member 20 and the upper end 52 of the second leg 46 of the second member 40 bears upon the lower surface of the top plate 24 of the first member 20. In this configuration, there is a gap between the distal end 50 of the first leg 42 and the bottom plate 26 of the first member 26. From this position, the second member 40 may be rotated about the shoulder bolt 60 in the direction of arrow 100, that is, counterclockwise as illustrated. Rotation from the position shown in FIG. 5 in the opposite direction of arrow 100 is not possible due to the engagement of the surface 52 onto the lower surface of top plate 24. Once the rotation in the direction of arrow 100 has reached approximately 90°, the first and second members, 20 and 40 respectively, are in the relative position illustrated in FIG. 6, whereupon a further movement of the second member 40 into the channel 36 of the distal end 32 of the first member 20 may be achieved by sliding the second member 40 along its longitudinal slot 48 in the direction of arrow 102, that is, to the left as illustrated. As further illustrated in FIG. 7, when this sliding proceeds to a point where the upper end 52 of the second member 40 bears upon the end of the lower plate 26, no further inward sliding is possible, but now the second member 40 is secured in place by the bearing of the second member, particularly the side 54, upon the lower surface of the top plate 24 of the first member 20.

It will be obvious from the above illustrations that the bracket 10 of the present invention may be moved from the position shown in FIG. 7 to the position shown in FIG. 5 by reversing the direction and order of the steps described in FIGS. 5, 6 and 7.

In common practice it will be found useful to have a pair of the brackets 10 of the present invention used in coacting manner to support and pivotably move a heavy load, such as a brake as used in a siding industry. In a typical example, as illustrated in FIGS. 8 and 9, at least two brackets 10 are mounted to a vertical support surface 200 in a parallel fashion so that they can pivotally rotate coactingly to move an object 210, which rests upon, and is preferably affixed to, third leg 44. Connection of bracket 10 to support surface 200 is made at proximal end 28 of the first member 20, and, as particularly illustrated in FIG. 8, such connection may be made by known fastening means such as a shoulder bolt 60 and nut 62. When the bracket 10 or plurality of brackets 10 are in the position illustrated in FIG. 5, the supported item 210 is in the position illustrated in FIG. 8. After being pivoted and slidingly engaged as described in FIGS. 5, 6, and 7 the supported item 210 is in a stowed position approximately 90° from that in which it is positioned in a usable fashion. This latter position is as shown in FIG. 9. In a particular application of the bracket 10 of the present invention, the supported item 210 would be the heavy tool used in the aluminum siding industry for bending and shaping siding, known as a "brake" and the support surface 200 would be the vertical side of a vehicle such as a pickup truck.

While in accordance with the patent statutes the best mode and preferred embodiment of the invention has been described, it is to be understood that the invention is not limited thereto, but rather is to be measured by the scope and spirit of the appended claims.

I claim:

1. A bracket for pivotally mounting an object to a rigid surface, said bracket comprising:

an essentially hollow tubular first member having two mirror-image side plates connected in a parallel manner by a bottom plate and a top plate and having first and second ends, said first end being adapted for mounting to said rigid structure, and said second end being a clevis wherein said side plates comprise the forks of said clevis, each said fork having an aperture colinearly disposed therethrough, the essentially hollow interior of said first member comprising a channel at said second end;

an essentially hollow tubular second member having an essentially "Z"-shape comprising first, second and third straight sections, each said straight section having first and second ends, said sections connected sequentially in essentially perpendicular manner so that the second end of said first section is attached to the first end of said second section and the first end of said third section is attached to the second end of said second section, an elongate slot is disposed longitudinally on said second section co-planar to the "Z"-shape, said first an second sections being of proper dimension so that said first section will fit within said clevis forks at said second end of said first member when said elongate slot is positioned colinearly with the apertures at said second end of said first member;

a means for fastening said first member to said second member when said elongate slot and said apertures at the second end of the first member are aligned colinearly;

a means for mounting said first end of said first member to said rigid surface; and a means for mounting said object to the third section of said second member.

2. The bracket of claim 1 wherein said first member and said second member have essentially rectangular cross-sections.

3. The bracket of claim 2 wherein said first member and said second member have essentially square cross-sections.

4. The bracket of claim 1 wherein the means for fastening said first and second members when said elongate slot and said apertures in the clevis forks at second end of the first member are aligned colinearly comprises a shoulder bolt disposed sequentially through a first of the apertures in the first member, the elongate slot in the second member, and a second of the apertures in the first member, and a nut to secure said shoulder bolt once so positioned.

* * * * *